United States Patent [19]

Moore et al.

[11] Patent Number: 5,194,987

[45] Date of Patent: Mar. 16, 1993

[54] AUTOMATIC POWER CHANGE MECHANISM FOR RIFLESCOPES OR THE LIKE

[75] Inventors: Sidney D. Moore, Claremont; Hans A. Jorgensen, Placentia, both of Calif.

[73] Assignee: Bausch & Lomb Incorporated, Rochester, N.Y.

[21] Appl. No.: 753,528

[22] Filed: Sep. 3, 1991

[51] Int. Cl.$^5$ .................... G02B 7/04; G02B 15/00
[52] U.S. Cl. .................... 359/422; 359/432; 359/701; 359/702
[58] Field of Search ............. 359/699, 700, 701, 702, 359/422, 432

[56] References Cited

U.S. PATENT DOCUMENTS

| | | | |
|---|---|---|---|
| 3,213,539 | 10/1965 | Burris | 33/50 |
| 3,633,483 | 1/1972 | Nagashima | 359/701 X |
| 3,927,932 | 12/1975 | Chrosziel | 359/701 X |
| 4,229,074 | 10/1980 | Nonogaki | 359/702 X |
| 4,255,013 | 3/1981 | Allen | 350/10 |
| 4,461,545 | 7/1984 | Yokotsuka | 359/702 |
| 4,488,787 | 12/1984 | Osawa | 359/700 X |
| 4,497,548 | 2/1985 | Burris | 359/422 |
| 4,533,218 | 8/1985 | Nakazato et al. | 359/702 X |
| 4,789,231 | 12/1988 | Shimizu | 350/560 |
| 4,952,041 | 8/1990 | Sandall | 350/560 |
| 4,986,645 | 1/1991 | Ekstrand | 350/560 |
| 4,998,811 | 3/1991 | Basta | 359/422 |

Primary Examiner—Eugene R. LaRoche
Assistant Examiner—Do Hyun Yoo
Attorney, Agent, or Firm—Craig E. Larson

[57] ABSTRACT

A power change mechanism for variable power riflescopes includes a resilient member disposed between the riflescope housing and the power change ring for automatically rotating the power change ring from one power setting to another upon activation of a latch mechanism. The automatic power change mechanism may include apparatus for overriding such automatic capabilities in order to provide for manual power change.

10 Claims, 5 Drawing Sheets

AUTOMATIC POWER CHANGE MECHANISM FOR RIFLESCOPES OR THE LIKE

The present invention relates to riflescopes and, more particularly, to an apparatus for automatically accomplishing changes in power settings of riflescopes.

BACKGROUND OF THE INVENTION

Telescopic riflescopes have been used by hunters for many years. Simple versions of riflescopes include devices whose power settings are fixed at a single power magnification which may be as low as, for example, three power (3X), and may range up to higher magnifications on the order of forty power (40X). However, as stated, the power setting of such riflescopes is fixed and, therefore, cannot be changed.

In certain situations, lower powered riflescopes are desirable as the field of view available to the hunter is extensive. However, as can be readily understood, there are many instances where higher powered riflescopes are desirable for improved aim, and the like. But, increased power is accompanied by a proportionate decrease in the field of view. Also, of significance is the fact that by increasing the power of magnification the amount of illumination transmitted through the optical system is proportionately decreased. This condition contributes to the difficulty of defining a target at higher power magnifications when lighting conditions are minimal, such as occur during early morning and early evening hours.

Inevitably, a riflescope was devised which incorporated a mechanism capable of providing more than one power setting. This was accomplished by interconnecting the lenses contained within the erector lens assembly to a power change ring, mounted externally about the riflescope housing adjacent the eyepiece. Rotation of the power change ring caused the lenses of the erector lens assembly to be moved which, in turn, provided a change of magnification of the object being viewed. This achievement provided a significant advantage over the fixed single power riflescopes previously available to hunters. Examples of riflescopes incorporating such mechanism may be seen in U.S. Pat. Nos. 3,213,539; 4,255,013; 4,789,231 and 4,986,645.

However, because of its design, the variable power riflescopes incorporated an inherent disadvantage. Briefly, in many situations in the field, it is normal practice for a hunter to set the power to one of the lower available magnifications, such as three power (3X) or four power 4X), in a typical variable riflescope such as a 3X-9X model. The hunter then scans the terrain in order to determine if there is any game in the area. As the lower power setting provides a much greater and brighter field of view than would a higher power setting, the hunter is readily able to scan large areas of terrain with a relatively quick sweep of the firearm and mounted riflescope. Should a target be defined within the field of view, it then becomes necessary for the hunter to increase the power setting to a higher magnification in order to more clearly define the target within the field of view. This requires manual rotation of the power change ring. It will be appreciated that in transition from low to high power the target image may be lost as the riflescope is swiveled or rocked from the original line of sight. The hunter must then repeat the entire process until the target image is maintained at the desired higher magnification. As game animals are acutely sensitive to movement, they are often spooked by the actions of the hunter in this power setting process and leave the area being scanned thereby frustrating the hunter in his attempt to get off a shot.

In an attempt to overcome the problems referenced above, V. R. Sandall in U.S. Pat. No. 4,952,041 discloses a riflescope which incorporates a battery operated motor connected to a zoom lens assembly by way of gearing to effectively cause the zoom lens assembly to either increase or decrease the power of magnification upon movement of an external mounted switch.

While the riflescope described in this particular patent does provide a solution to the problem inherent in the previously described riflescopes, it does itself suffer from several inherent problems. The first and most significant is that the riflescope depends upon an electronic motor whose energy source is batteries for its automatic zoom mode. It is evident that in order for the riflescope to function properly that both the batteries and the motor must be maintained in good order. Should the batteries lose their electrical charges, the power zoom capabilities of the riflescope are effectively disabled. Also, should the motor become disabled, the power zoom mechanism is, in turn, disabled. Should any of these devices fail while the hunter is in the field, the probability of acquiring game is significantly reduced.

A further problem encountered by this scope is one of noise. As the zoom mechanism is drawn by an electronic motor and gear mechanism, it inherently emits noise when energized. As most game animals have very acute hearing, there is a likelihood that the game may detect noise and be frightened away from the area before the hunter can get off an accurate shot.

A still further problem with a riflescope of this type is on of cost. Although modern electronics are fairly economical in and of themselves, their addition to a sports optics device, such as a riflescope, will surely result in a much more costly product.

In view of the above, there still remains a strong need for a riflescope which features a simple, low-cost non-electric apparatus for automatically and rapidly changing the power settings.

SUMMARY OF THE INVENTION

The riflescope of the present invention overcomes the problems inherent in the riflescopes described above. It includes apparatus for allowing the hunter to automatically change from one power setting to another without disrupting the image being viewed. If desired, the automatic power change mechanism may be readily changed back and forth from one setting to another.

The automatic power change apparatus includes a biasing mechanism mounted between the riflescope housing and the power change ring. The biasing mechanism is lockable at a first power setting of the power change ring and releasable therefrom to rotate the power change ring to a second power setting. The biasing mechanism may comprise a resilient member which may be a coiled torsion spring.

The automatic power change apparatus may further include apparatus for overriding the automatic power change feature of our new riflescope. The override apparatus may be fixed to the biasing mechanism and disposed between the power change ring and the eyepiece housing of the riflescope and may be operable between a first position wherein the automatic power change mechanism is enabled, and a second position wherein the automatic power change mechanism is disabled. This allows our new riflescope to be fully functional in the manner of a conventional variable power riflescope while being instantly settable for automatic operation as the situation dictates.

DETAILED DESCRIPTION OF THE INVENTION

Description of the Parts of the Apparatus

Figure 1:
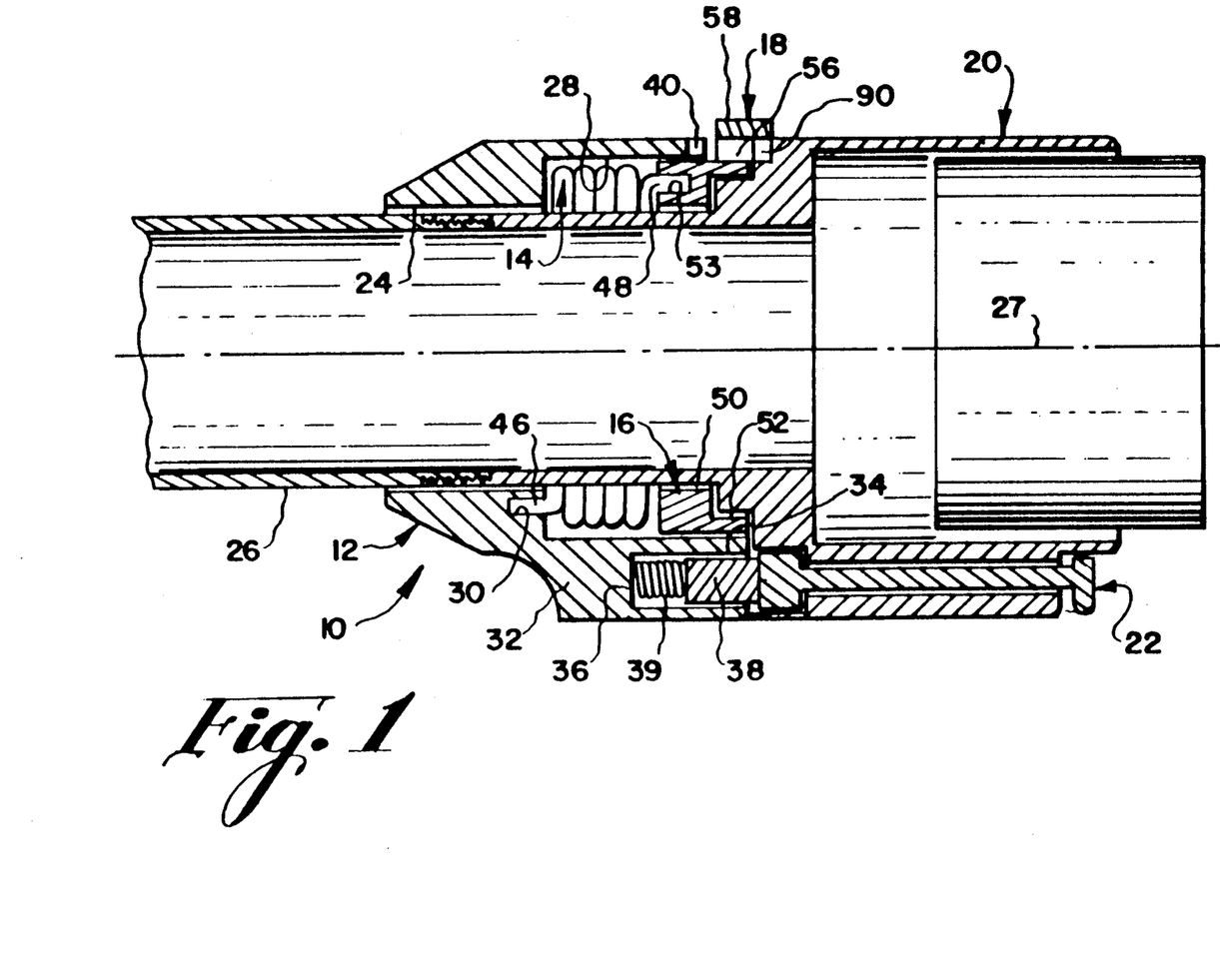
FIG. 1 is a cross-sectional view of the preferred embodiment of our new automatic power change mechanism for riflescopes set in the automatic mode.
Figure 2:
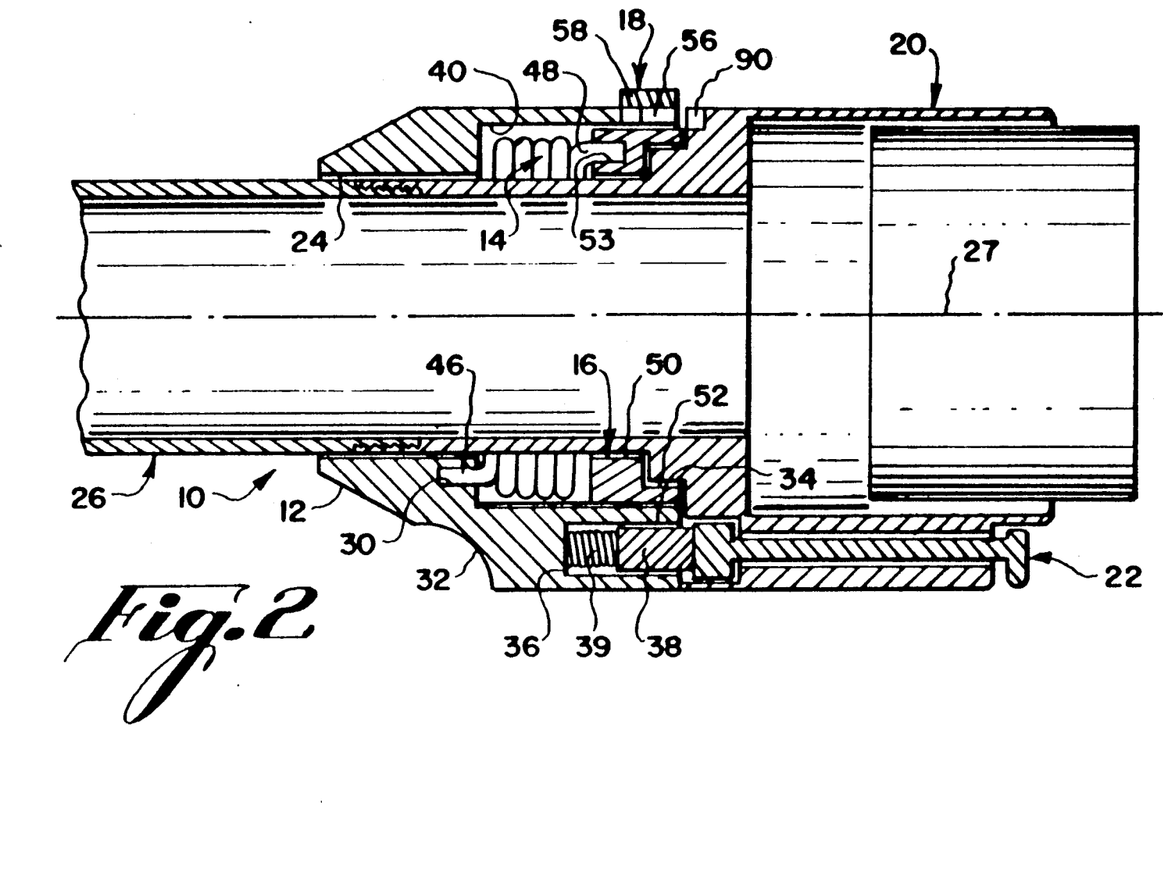
FIG. 2 is a cross-section view similar to FIG. 1 showing our new automatic power change apparatus with the lockout mechanism in the manual operation mode.

FIGS. 1 and 2 are cross-sectional views of our new apparatus 10 for accomplishing automatic power changes in sports optics devices such as, for instance, riflescopes. The apparatus 10 generally includes a power change ring 12, a resilient member 14, an anchor ring 16 having a latch mechanism 18, and an eyepiece barrel 20 which incorporates a release mechanism 22.

The power change ring 12 includes a first bore 24 sized to closely fit about the diameter of a riflescope housing 26 having an axis 27 and a second stepped bore 28 for housing the resilient member 14 which may comprise a coiled spring. Stepped bore 28 further includes a tang receiving aperture 30 formed therein generally parallel to optical axis 27. An extended lobe portion 32, which includes a bore 34 having a bottom 36 as best seen in FIGS. 1 & 2, is formed on power change ring 12. A latch pin 38 is biased by way of spring 39 against bottom 36 of bore 34. Power change ring 12 further has a notch 40 formed in its periphery which may include a plurality of flutes 42 and marking indicia 44.

The resilient member, or as will be hereinafter referred to as coiled spring 14 includes tangs 46 and 48 formed on opposite ends thereof. The outer periphery of coiled spring 14 is configured so as to fit within and be received by bore 28 of power change ring 12.

Figure 3:
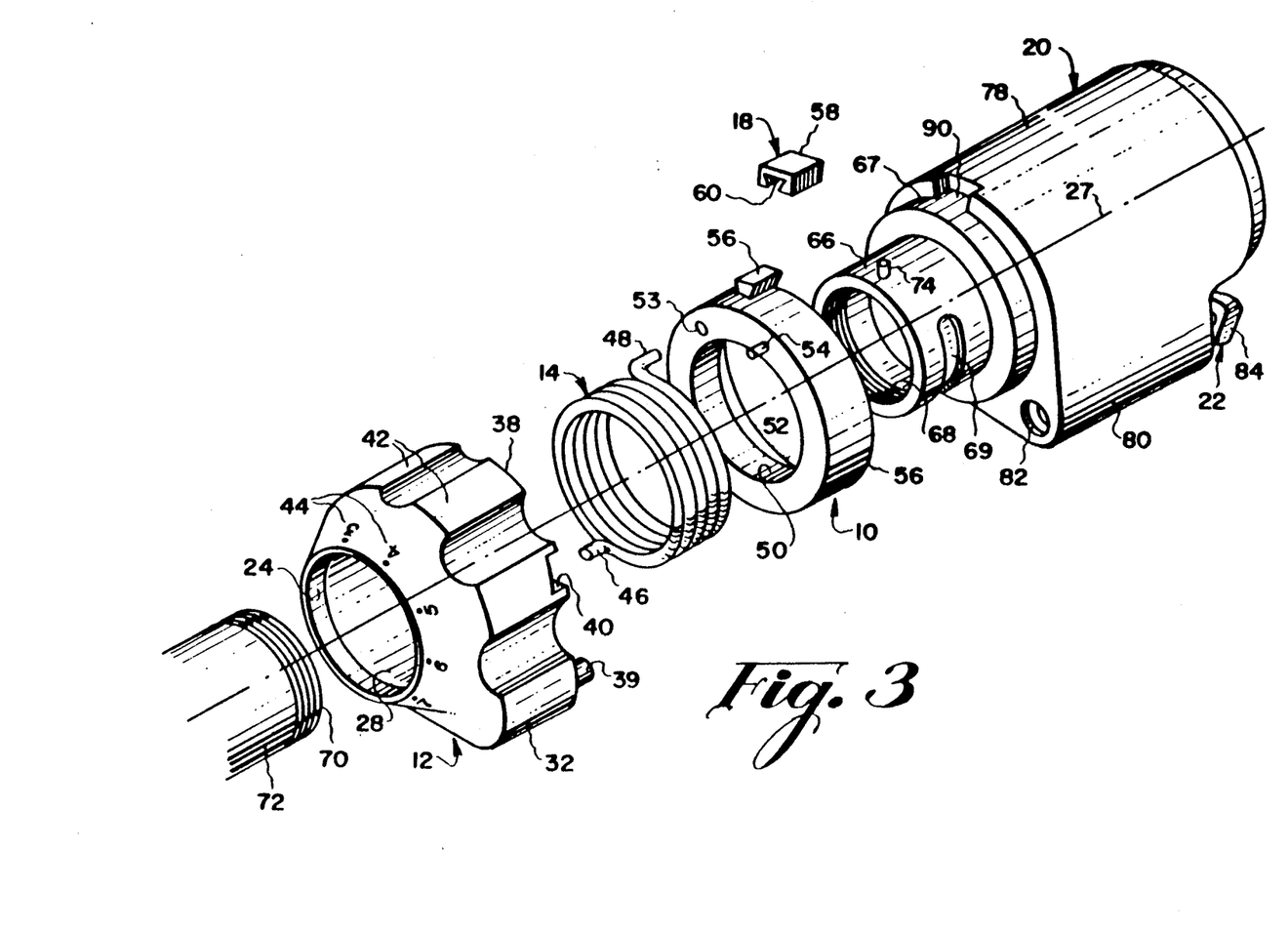
FIG. 3 is an exploded perspective view of the apparatus shown in FIGS. 1 and 2.

The anchor ring 16 includes a stepped internal bore comprising steps 50 and 52. A tang receiving aperture 53 is formed in anchor ring 16 generally parallel to optical axis 27. As best illustrated in FIG. 3, a stop pin 54 is positioned on anchor ring 16. The previously referenced latch mechanism 18 comprises a guide member 56 formed on anchor ring 16 and a latch button 58 having a slot 60 configured so as to be slidably received thereon.

Eyepiece barrel 20 includes first and second cylindrical portions 66 and 67. First portion 66 contains a screw 74 and internal threads 68 sized to mate with external threads 70 of riflescope housing 72. The diameters of first and second cylindrical portions 66 and 67, respectively, are dimensioned so as to mate with steps 50 and 52, respectively, of anchor ring 16. First cylindrical portion 66 is further configured so as to mate with bore 24 of power change ring 12, as best illustrated in FIGS. 1 and 2. Additionally, eyepiece barrel 20 includes a third generally cylindrical portion 78 having formed thereon an extended lobe portion 80 shaped generally to correspond to extended lobe portion 32 of power change ring 12. Lobe portion 80 includes a stepped bore 82 in which release mechanism 22 comprising a latch release pin 84 is slidably received. Finally, a notch 90 is formed in cylindrical portion 78 adjacent cylindrical portion 67.

Assembly of the Apparatus

By reference now to FIGS. 1-3, the assembly of our new automatic power change apparatus 10 for riflescopes will be fully described.

Resilient member 14, which, as previously stated, may comprise a coiled torsion spring, is positioned within stepped bore 28 of power change ring 12 such that tang 46 is received within tang receiving aperture 30. Subsequently, anchor ring 16 is positioned within stepped bore 28 of power change ring 12 in a manner to cause tang 48 of spring 14 to be captured within tang receiving aperture 53. The resulting subassembly of power change ring 12, spring 14 and anchor ring 16 is disposed over riflescope housing 72 and thereafter eyepiece barrel 20 is secured to housing 72 in a manner old and well known to those skilled in the art. The connection between the erector lens assembly, not shown, and power change ring 12 will not be discussed as it is quite conventional and old and well known in the art.

Operation of the Apparatus

Apparatus 10, has two modes of operation which permits the operator to select between an automatic mode and a manual mode. In the automatic mode two distinct powers of magnification are available such as, for instance, 3X and 9X. To accomplish this mode, the latch button 58 is slidably moved on guide member 56 to engage notch 90 of eyepiece barrel 20 as shown in FIG. 3, which effectively locks the anchor ring 16 to the eyepiece barrel 20. Thereafter, power change ring 12 is manually rotated by the operator to the 3X position. As tang 46 of spring 14 is captured by tang receiving aperture 30 of power change ring 12, it is likewise caused to rotate. However, as the opposing tang 48 is fixed to tang receiving aperture 53 of fixed anchor ring 16, such rotation of power change ring 12 results in the tensioning of spring 14. When power change ring 12 is fully rotated to the tensioned position, which, for instance, may be the 3X setting, its lobe portion 32 is in alignment with mating lobe portion 80 of eyepiece barrel 20. As best illustrated in FIGS. 1 and 2, spring biased latch pin 38 seats, generally, in stepped bore 82 of lobe portion 80 and against the face of latch release pin 84. Thus, the apparatus is latched in the low power, e.g. 3X, position, and the hunter may readily scan a large expanse of terrain.

Upon referencing a target within the defined relatively wide field of view, the hunter may actuate release mechanism 22 simply by pressing latch release pin 84 which is readily accessible to the operator's thumb while the rifle/riflescope combination is securely held in aim upon the target. By pressing release pin 84, spring-biased latch pin 38 is caused to disengage from stepped bore 82 which, in turn, releases power change ring 12 from engagement with eyepiece barrel 20. Accordingly, the tension stored in spring 14 is released. Because of the interconnection of power change ring 12 to spring 14, the former is caused to rotate from the latched low power setting to its high power setting. The amount of rotation of power change ring 12 is controlled by an old and well known mechanism comprising an elongated screw, not shown, fixed in power change ring 12 and in communication with a rotation limiting slot 69 formed in cylindrical portion 66 of eyepiece barrel 20.

The hunter, by simply depressing release mechanism 22, enables the automatic power change operation and the magnification is automatically increased from low power to high power for improved target definition.

Notwithstanding the above described advantages of automatic power changes, under certain conditions the hunter may desire to override such operation. This is accomplished, as best shown in FIG. 2, simply by sliding latch button 58 of latch mechanism 18 from engagement in notch 90 of eyepiece barrel 20 into engagement with notch 40 of power change ring 12. The effect of this action is to disable spring 14, thus preventing the tensioning thereof upon rotation of power change ring 12. This is because power change ring 12, spring 14 and anchor ring 16 are effectively locked together as a unit when latch button 58 is engaged in notch 40 of power change ring 12. Therefore, spring 14 rotates freely with rotation of power change ring 12. In this condition the above components act in concert in a manner similar to conventional variable power riflescopes. Thus, the hunter is afforded the opportunity to select an infinite number of power settings between the low and high magnifications of the riflescope.

To prevent activation of release mechanism 22 during manual operation, stop pin 54 formed on anchor ring 16 is positioned so as to engage stop screw 74 fixed to first cylindrical portion 66 of eyepiece barrel 20 thereby stopping rotation of power change ring 12 just prior to engagement of spring-biased latch pin 39 with stepped bore 82 of eyepiece barrel 20.

Figure 4:
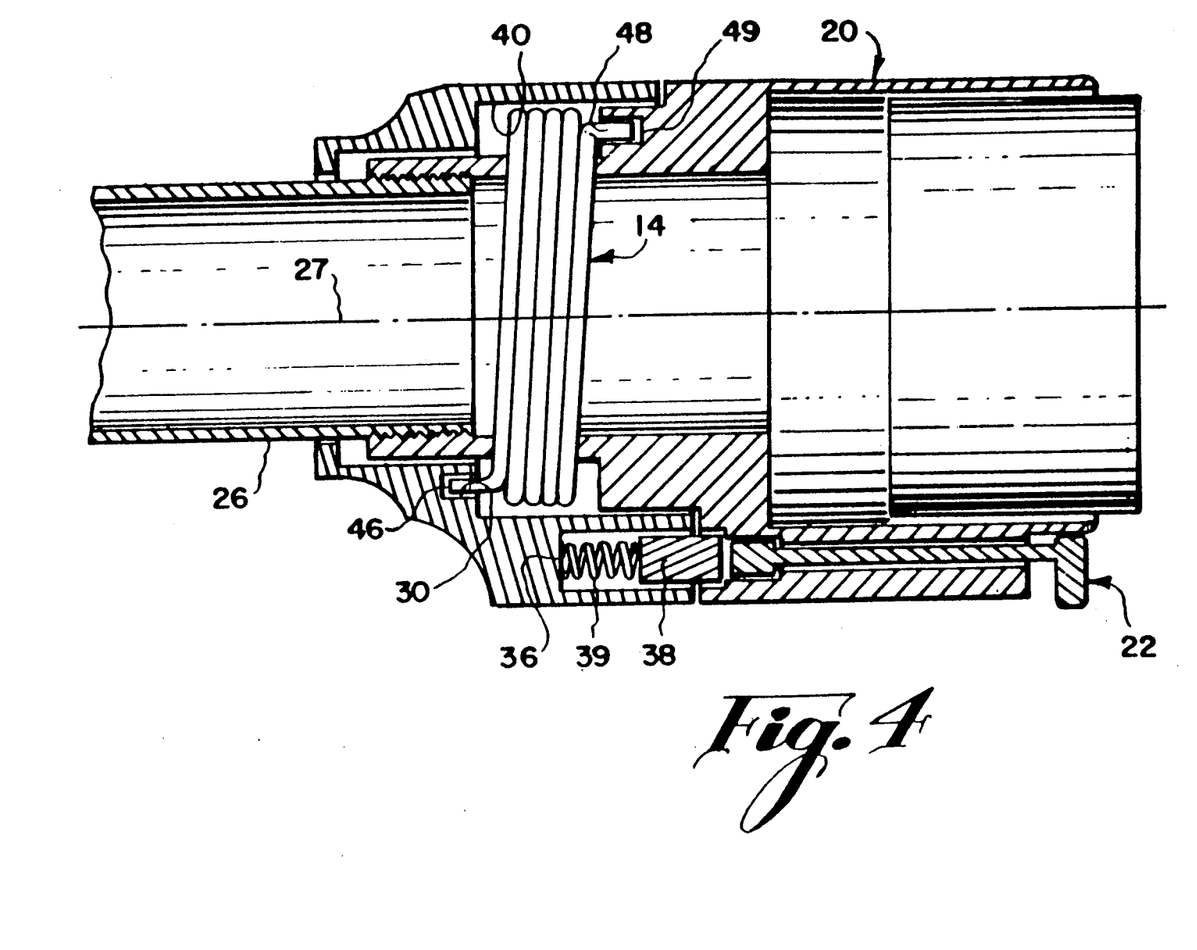
FIG. 4 is a cross-sectional view of a simplified version of our new automatic power change apparatus for riflescopes.
Figure 5:
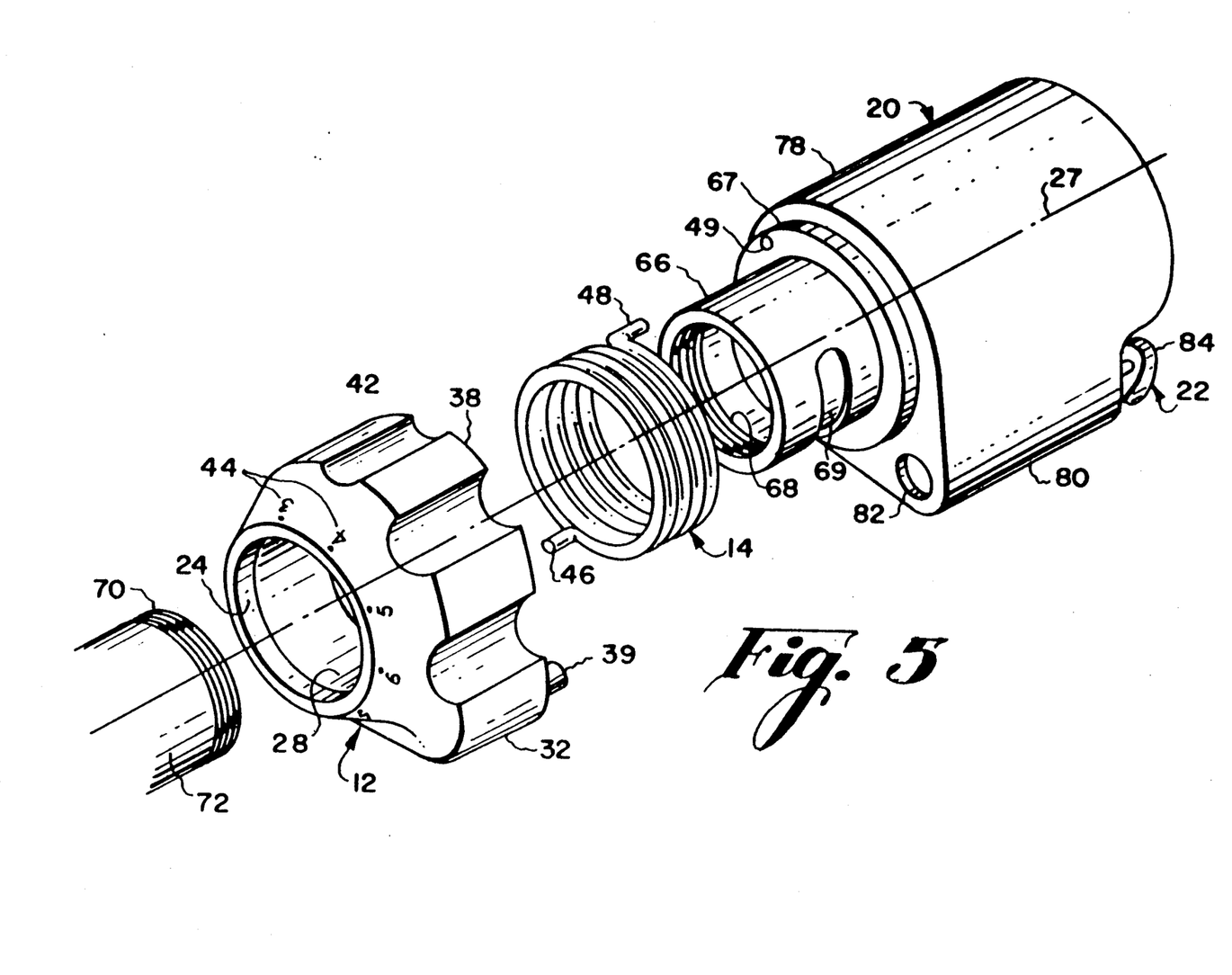
FIG. 5 is an exploded perspective view of the apparatus shown in FIG. 4.

By referring now to FIGS. 4 and 5, an alternate embodiment of the invention will be described. As this alternate embodiment incorporates many of the elements of the previously described preferred embodiment, like numbers and descriptions will be assigned to like elements.

As can be appreciated, this simplified structure provides only automatic operation of the power change mechanism as the manual override function has been omitted due to the absence of anchor ring 16 and latch mechanism 18. Thus, any rotation of power change ring 12 from the high power limit toward a lower power setting tensions spring 14, as one end 48 thereof is fixed to a tang receiving aperture 49 formed in stationary eyepiece barrel 20 while its opposite end 46 is fixed to rotatable power change ring 12. The effect of the above is that automatic power change apparatus 10 is either latched in the low power setting or, when unlatched therefrom, rotated to its high power setting.

While the foregoing description is particular in describing embodiments of the instant invention, it is to be understood and appreciated that numerous alternative embodiments and structures may be used with equal effectiveness in particular embodiments anticipated by the invention but not described herein. It is anticipated and envisioned herein that the present invention may be embodied in devices other than riflescopes. Accordingly, it will be understood by those skilled in the art that changes in form and detail ma be made without departing from the spirit and scope of the invention.

We claim:

1. Apparatus for automatically accomplishing power changes in a variable power riflescope having an objective lens, an erector lens assembly, an eyepiece lens assembly, supported within a housing, and a power change ring rotatably fixed to and about said housing and in communication with said erector lens assembly, said power change ring having a first defined power setting and being rotatable therefrom to at least a second defined power setting; said apparatus comprising:
   a) latch means disposed on said housing for engagement with said power change ring for maintaining said power change ring at said first defined power setting and for releasing said power change ring for rotation to said at least second defined power setting; and
   b) means fixed between said housing and said power change ring for automatically rotating said power change ring from said first defined power setting to said at least second defined power setting upon release of said latch means from engagement with said power change ring.

2. The apparatus as set forth in claim 1, wherein said means fixed between said housing and said power change ring for automatically rotating said power change ring comprises a spring having first and second ends, said first end being affixed to said power change ring and said second end being affixed to said housing.

3. The apparatus as set forth in claim 2, wherein said spring has a predetermined amount of tension stored therein when said power change ring is secured by said latch means at said first defined power setting, said stored tension being released when said latch mean is activated thereby causing said power change ring to rotate to said at least second defined power setting.

4. The apparatus as set forth in claim 3, wherein said spring comprises a coiled torsion spring.

5. The apparatus as set forth in claim 1, wherein said latch means comprises an activating member moveably supported on said housing for effecting release of said power change ring from said first defined power setting to said at least second defined power setting upon activation thereof.

6. The apparatus as set forth in claim 1, wherein said latch means comprises a latch release member moveably mounted on said housing and a locking member mounted to said power change ring and secured to s id housing when said power change ring is in said first defined power setting, said latch release member being movable to contact and release said locking member from engagement with said housing thereby releasing said power change ring for rotation to said at least second power setting.

7. Apparatus for automatically accomplishing power changes in a variable power riflescope having an objective lens, an erector lens assembly, an eyepiece lens assembly, supported within a housing and a power change ring rotatably fixed to and about said housing and in communication with said erector lens assembly, said power change ring having a first defined power setting and being rotatable therefrom to at least a second defined power setting; said apparatus comprising:
   a) latch means disposed on said housing for engagement with said power change ring for maintaining said power change ring at said first defined power setting and for releasing said power change ring for rotation to said at least second defined power setting;

b) means fixed between said housing and said power change ring for automatically rotating said power change ring from said first defined power setting to said at least second defined power setting upon release of said latch means from engagement with said power change ring; and c) means mounted to said housing and said power change ring for selectively enabling and disabling the automatic power change operation of the variable power riflescope.

8. The apparatus as set forth in claim 7, wherein said means for selectively enabling and disabling comprises a ring member rotatably mounted to said housing and fixed to said means for rotating said power change ring.

9. The apparatus as set forth in claim 8, wherein said ring member has latch means defined thereon for engagement in a first position with said housing whereby the automatic power change operation is enabled and movable to a second position for engagement with said power change ring whereby the automatic power change operation is disabled, thereby permitting manual power change operation.

10. The apparatus as set forth in claim 9, wherein said latch means on said ring member comprises a member reciprocal between the first position in engagement with said housing to enable the automatic power change operation and the second position for engagement with said power change ring to disable said automatic power change operation.

* * * * *

UNITED STATES PATENT AND TRADEMARK OFFICE
CERTIFICATE OF CORRECTION

PATENT NO. : 5,194,987

DATED : March 16, 1993

INVENTOR(S) : Sidney D. Moore and Hans A. Jorgensen

It is certified that error appears in the above-identified patent and that said Letters Patent is hereby corrected as shown below:

In Column 1, line 51, change "4X)" to "(4X)".

In Column 2, line 11, change "external" to "externally".

In Column 2, line 36, change "on of cost" to "one of cost".

In Column 5, line 67, change "ma be" to "may be".

In Column 6, line 46, change "s id" to "said".

Signed and Sealed this

Sixteenth Day of November, 1993

Attest:

BRUCE LEHMAN

Attesting Officer

Commissioner of Patents and Trademarks